United States Patent [19]
Kubes et al.

[11] Patent Number: 6,035,180
[45] Date of Patent: *Mar. 7, 2000

[54] COMMUNICATION MODULE HAVING SELECTIVELY PROGRAMMABLE EXTERIOR SURFACE

[75] Inventors: Joseph Kubes, Raleigh; John Joseph Hayes, Jr., Wake Forest, both of N.C.

[73] Assignee: Ericsson Inc., Research Triangle Park, N.C.

[*] Notice: This patent is subject to a terminal disclaimer.

[21] Appl. No.: 08/946,270

[22] Filed: Oct. 7, 1997

[51] Int. Cl.[7] ........................................... G08B 5/00
[52] U.S. Cl. ................. 455/90; 455/566; 340/815.4; 340/825.81; 340/815.53; 340/693; 313/509; 313/512
[58] Field of Search .............. 370/815.4, 825.81; 455/90, 566; 313/509, 512

[56] References Cited

U.S. PATENT DOCUMENTS

| | | | |
|---|---|---|---|
| 4,608,457 | 8/1986 | Fowler et al. | 179/2 A |
| 4,613,793 | 9/1986 | Panicker et al. | 315/169.3 |
| 4,614,668 | 9/1986 | Topp et al. | 427/66 |
| 4,665,342 | 5/1987 | Topp et al. | 313/505 |
| 4,758,830 | 7/1988 | Levien et al. | 340/712 |
| 5,008,579 | 4/1991 | Conley et al. | 310/303 |
| 5,097,396 | 3/1992 | Myers | 362/32 |
| 5,124,610 | 6/1992 | Conley et al. | 310/303 |
| 5,149,923 | 9/1992 | Demeo | 200/5 A |
| 5,235,232 | 8/1993 | Conley et al. | 310/303 |
| 5,384,459 | 1/1995 | Patino et al. | 250/229 |
| 5,397,867 | 3/1995 | Demeo | 200/5 A |
| 5,405,710 | 4/1995 | Dodabalapur et al. | 428/690 |
| 5,510,782 | 4/1996 | Norris et al. | 341/22 |
| 5,739,180 | 4/1998 | Taylor-Smith | 523/203 |
| 5,773,931 | 6/1998 | Shi et al. | 313/509 |
| 5,814,417 | 9/1998 | Nagayama | 428/690 |
| 5,877,695 | 3/1999 | Kubes et al. | 340/815.4 |
| 5,902,688 | 5/1999 | Antoniadis et al. | 428/690 |

FOREIGN PATENT DOCUMENTS

| | | |
|---|---|---|
| 0 644 564 | 3/1995 | European Pat. Off. . |
| WO 94/14180 | 6/1994 | WIPO . |

OTHER PUBLICATIONS

David Lieberman, Plastic Displays, OEM Magazine, Apr. 1996, pp. 76–77.

Philips Mobile Computing Corp., *Velo, An Exploration Into Mobile Computing*, pp. 3–28.

National Aeronautics & Space Commission, Langley Research Center, NASA Tech Brief, "*Two–Layer, Full–Color Electroluminescent Display*", Springfield, VA, USA, Jul. 1987, p. 0636, XP–002054680.

*Primary Examiner*—William G. Trost
*Assistant Examiner*—Sonny Trinh
*Attorney, Agent, or Firm*—Jenkens & Gilchrist, P.C.

[57] ABSTRACT

An organic electroluminescent material is sealed within the outer housing of a portable radio telephone along with the control grids to cause the material to luminesce in a pixilated pattern. The pixels are controlled to both create a decorative design on the housing of the telephone and to generate a user input-output region and a display region. A touch screen may be included within the user input-output region.

17 Claims, 5 Drawing Sheets

1. TURN OFF ALL ROWS
2. DISABLE CLK
3. LOAD DOWN CNT-COLUMN 1 FOR ROW m
4. LOAD DOWN CNT-COLUMN 2 FOR ROW m
n+2. LOAD DOWN CNT-COLUMN N FOR ROW m
n+3. ENABLE ROW m, START CK
n+4. DELAY
n+5. INCREMENT m

COMMUNICATION MODULE HAVING SELECTIVELY PROGRAMMABLE EXTERIOR SURFACE

CROSS REFERENCE TO RELATED APPLICATIONS

This application is related to U.S. application Ser. No. 08/747,846 filed Nov. 13, 1996 in the name of Kubes et al. and etitled "Electroluminescent Backlit Devices" and U.S. Pat. No. 5,877,695, filed on even date herewith in the name of Kubes and entitled "Visual Alarm for a Communication Module", both of which are hereby incorporated by reference herein.

BACKGROUND OF THE INVENTION

1. Field of the Invention

The present invention relates to communication devices, such as mobile telephones, pagers and personal digital assistance (PDAs), and more particularly, to an exterior surface for such devices which incorporate organic electroluminescent materials.

2. Description of the Related Art

In modem modular digital communication devices, such as, mobile telephones, pagers and PDAs, the external appearance and aesthetic design aspects of such devices are becoming increasingly important both from the standpoint of consumer marketing appeal as well as from the user interface point of view. Such devices are now manufactured with various bright colored plastic housings and are often decorated with designs such as flowers to increase their appeal to consumers. Certain designs of cellular telephones, for example, also offer customization features such as flip covers over the display and keypad areas which come in assorted colors as well as with artistic designs on the outer surface. In addition, various models of modular communication devices may incorporate different sizes and/or color combinations of keypads and have various sizes of display areas, typically liquid crystal displays (LCDs), depending upon the number of parameters needed to be displayed and the type of use for which the device is intended.

Mobile telephones have also included numerous different types of user inputs. For example, keypads may include traditional push switches or rectangular spring biased molded plastic keys, each with or without backlighting.

The popularity of each of these techniques for decorating the exterior of a communication device comes and goes with the decorative trends of the moment. Keypad and other user interface designs are generally fixed when a device such as a mobile telephone is manufactured and substantial expense is required in order to change the design. Moreover, with current approaches to mobile phone user interfaces and aesthetic decoration, there is very little opportunity for a user to customize the external appearance of the phone from time to time after it has been purchased and put into use.

Thus, a need exists for a design by which the appearance of a communication device such as a mobile telephone, can be selectively programmed by either the manufacturer or the user in a universal fashion. That is, it would be a distinct advantage if not only the color and/or design of the exterior of the device could be selectively defined and/or periodically changed by a user, but also the actual user interface, including user input and output designs on the exterior surface of the device. The system of the present invention incorporates such advantages.

BRIEF SUMMARY OF THE INVENTION

In one aspect the present invention includes an outer housing for a modular telecommunication device in which an upper and lower shell are sealed to one another and formed of a material which is impervious to moisture and oxygen with at least a portion of the upper shell being transparent to light. An electroluminescent display assembly is contained within the sealed upper and lower shells and includes a composite layer of electroluminescent material having the characteristic of producing illumination in response to current flow through the material. A first layer of electrically conductive material is positioned on one side of the layer of composite electroluminescent material and comprises a plurality of parallel elongate conductive strips each of which is separate and electrically insulated from the other and connected to an electrical terminal on the outside of the sealed upper and lower shells. A second layer of electrically conductive material is positioned on the other side of the layer of composite organic electroluminescent material and comprises a plurality of parallel elongate conductive strips each of which is also separate and electrically insulated from the other and extending in a direction at an angle to the conductive stirps in the first layer to define a pixel area within the organic electroluminescent layer between each crosspoint region between an overlying and underlying conductive strip. Each of the strips in said second layer are also connected to an electrical terminal on the outside of the sealed upper and lower shells. A circuit selectively applies electrical power to the electrical terminals connected to selected ones of the separate strips within the first and second conductive layers to illuminate the pixel areas at the crosspoint regions between each underlying and overlying conductive strip to which electrical power is selectively applied which allows the illuminated pixels to be visible through all portions of the upper and lower shell which are transparent.

In a further aspect of the outer housing for the modular telecommunication device, the conductive material in one of the first and second layers of conductive material includes indium tin oxide (or another suitable clear, electrically conductive material or alloy) and the conductive material in the other layer includes aluminum (or other suitable reflective conductive material or alloy) and the respective longitudinal axes the conductive strips in the two layers extend perpendicular to one another.

In yet another aspect, the present invention includes a housing for a portable radio telephone having an outer shell formed of a material which is impervious to moisture and oxygen with at least a portion of the shell being transparent to light to define user input-output and user display regions. An organic electroluminescent display assembly is contained within the outer shell and includes a composite layer of organic electroluminescent material having the characteristic of producing illumination in response to current flow through the material. A first layer of electrically conductive material containing indium tin oxide or other clear, electrically conductive material is positioned on one side of the layer of composite organic electroluminescent material with the first layer comprising a plurality of parallel elongate conductive strips separated from one another and connected to an electrical terminal on the outside of the outer shell through a sealed aperture. A second layer of electrically conductive material containing aluminum or other reflective, electrically conductive material is positioned on the other side of the layer of composite organic electroluminescent material with the second layer comprising a plurality of parallel elongate conductive strips separated from one another and extending in a direction perpendicular to the conductive strips in the first layer to define a plurality of pixel areas within the organic electroluminescent layer between each crosspoint region between an overlying and underlying conductive strip. Each of the strips in the second layer are also connected to an electrical terminal on the outside of the outer shell through a sealed aperture. A touch sensitive screen may be positioned beneath at least a portion of the outer shell which is transparent and within the user input-output region with the screen having electrical connections passing through the sealed outer shell for connection to external circuitry for receiving input signals from a user. A circuit for selectively applying electrical power to the electrical terminals is connected to selected ones of the separate strips within the first and second conductive layers to illuminate the pixel areas at the crosspoint regions between each of the conductive strips on opposite sides of the composite organic electroluminescent layer to which electrical power is selectively applied and allow the illuminated pixels to be visible through all portions of the upper and lower shell which are transparent. The illuminated pixels provide visible guidance to a user within the user input-output region as to where to touch the screen in order to enter a desired input into the radio telephone and to provide visible messages to a user within the user display region which messages are related to operation of the radio telephone.

BRIEF DESCRIPTION OF THE DRAWINGS

For an understanding of the present invention and for further objects and advantages thereof reference can now be had to the following description, taken in conjunction with the accompanying drawings in which.

DETAILED DESCRIPTION OF THE PREFERRED EMBODIMENT

Figures 1, 2, 3, 3A, 4:
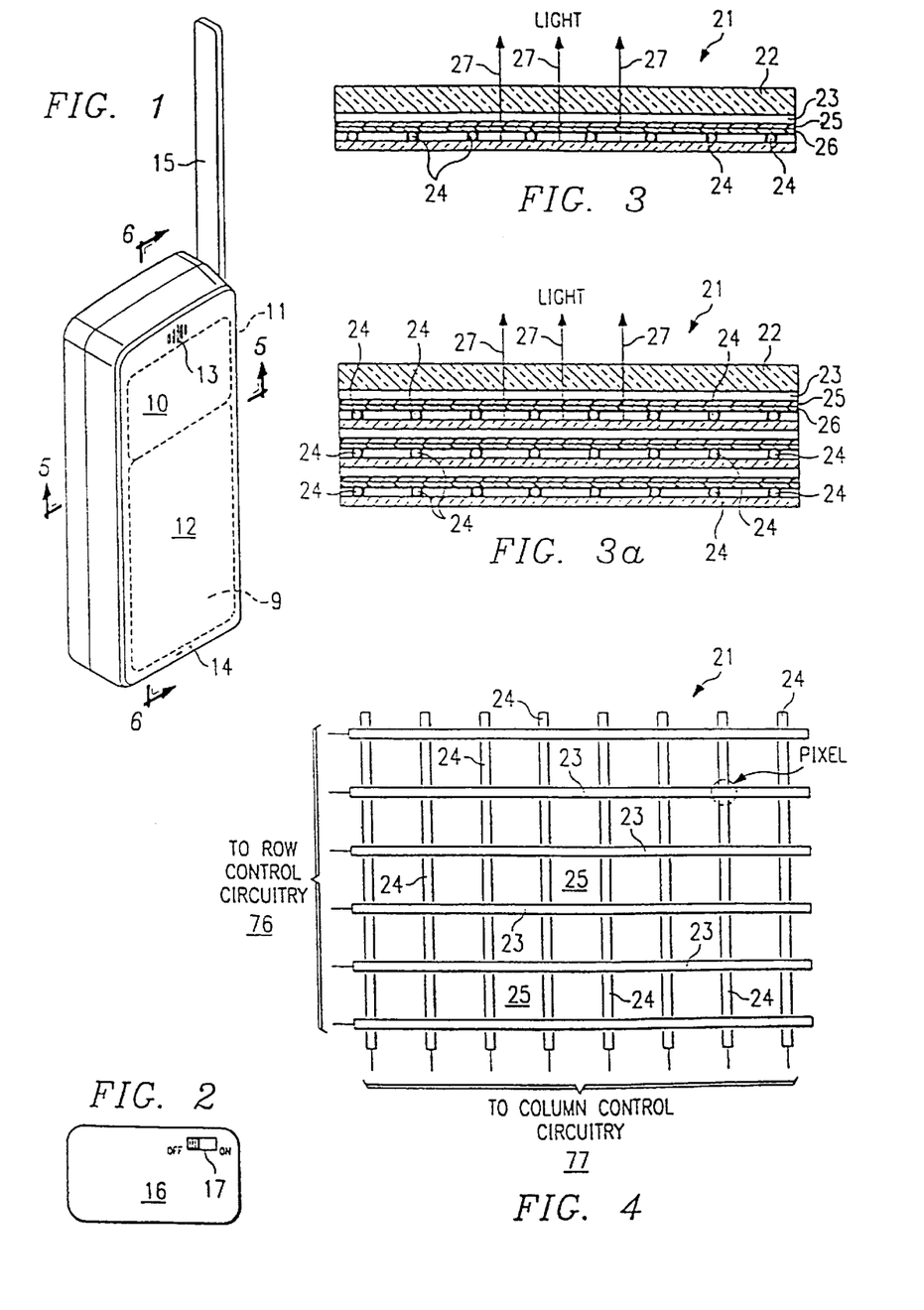
FIG. 1 is a top perspective view of a mobile radio telephone subscriber station constructed in accordance with the principles of the present invention.
FIG. 2 is an end view of the mobile radio telephone subscriber station of FIG. 1 constructed in accordance with the principles of the present invention.
FIG. 3 is an illustrative cross section view showing the construction of a portion of the exterior sidewall of the telephone of FIG. 1 which includes one layer of organic electroluminescent material for monochrome display generation in accordance with one embodiment of the invention.
FIG. 3a is an illustrative cross section view showing a portion of the construction of the exterior sidewall of the telephone of FIG. 1 which includes three layers of organic electroluminescent materials for full color display generation in accordance with another embodiment of the invention.
FIG. 4 is a an illustrative top view of the conductive control grids for the organic electroluminescent material of FIG. 3 which is used in the housing of the cellular radio telephone illustrated in FIG. 1.

Referring first to FIG. 1, there is shown a top perspective view of an illustrative modular communication device 11, such as mobile radio telephone subscriber station, constructed in accordance with the teachings of the present invention. It should be understood that the housing of the modular device 11 might be adapted for other communication units such as pagers, personal digital assistance (PDAs), laptop computers and the like. As can be seen, the upper surface 12 of the mobile telephone 11 is generally plain and smooth with apertures 13 for allowing sound to emanate from a speaker within the telephone to the ear of a user and apertures 14 for allowing sound from the voice of a user to reach a microphone within the telephone 1. A folding radio transmitting and receiving antenna 15 is also illustrated. As shown in the bottom end view of the telephone 11, the exterior surface 16 of the telephone may be relatively plain and smooth and may incorporate only a simple on/off switch 17 for selectively energizing the circuitry of the telephone. Part or all of the outer shell of the housing of the mobile telephone is composed of organic electroluminescent materials. These materials comprise synthetic monomers and polymers, i.e. plastics, that have the characteristic of producing light when subjected to an electric potential. Organic electroluminescent materials include material referred to as PPV (poly-p-phenylene-vinylene) a so-called "conjugated polymer" which emits a yellow-green light when energized. Such organic electroluminescent materials are also referred to as light emitting polymers (LEPS). Another organic electroluminescent material referred to as "Alq" is not a polymer but a hydroxyquinoline-aluminum monomer deposited material available from Kodak of Rochester, N.Y. Examples of organic electroluminescent materials suitable for use in the present invention are available from Electromaterials Corporation of America of Mamaroneck, N.Y.; Amersham International PLC of Buckinghamshire, England; Cambridge Display Technology, Ltd. of Cambridge, England; Eastman Kodak of Rochester, N.Y.; Philips Research Laboratories of Eindhoven, Netherlands; and Pioneer Electronics Corp. of Japan. These different types of materials and assemblies will be referred to herein generically as "organic electroluminescent materials."

Referring to FIG. 3, there is shown an illustrative cross section view of a segment of an outer shell comprising organic electroluminescent material of the type described above and employed in the present invention. The top layer 22 of the segment 21 comprises a transparent substrate such as a clear plastic, glass or the like which is impermeable to both moisture and oxygen. Immediately beneath the transparent layer 22 is a layer 23 comprising a plurality of narrow strips of a first translucent electrically conductive material preferably composed of indium tin oxide (ITO) or other such compound. This layer 23 may be formed by taking a solid layer of ITO and then selectively etching away parallel spaced apart strips to leave a series of parallel elongate conductive "wires" separated from one another across the entire area. The bottom conductive layer 24 is preferably also formed of elongate parallel strips of a second suitable electrically conductive material that may be reflective and is preferably composed of aluminum (Al) or other suitable compound. The bottom layer 24 also forms a plurality of parallel, spaced apart conductive strips which are each perpendicular to the strip in the ITO layer 23 and which also act like "wires" and conduct electricity along the surface of the layer 24. Located between the ITO conductive layer 23 and the Al conductive layer 24 are one or more layers of electroluminescent material 25 and 26 such as a LEP or Alq. If an LEP or Alq material is used, a hole transport and electron transport layer may be included on the top and bottom of the LEP or Alq layer, respectively. As mentioned above, these electroluminescent materials, such as PPV or Alq for example, produce a substantially high level of luminescence and emit light 27 in each discreet region which is exposed to a relatively low voltage potential. Thus, a voltage or current across the etched "wires" in layers 23 and 24 would cause light to be produced from the regions of the composite layers 25/26 of electroluminescent material which is exposed to that voltage at the crosspoints of the two "wires." The single layer of electroluminescent material 25/26 produces monochromatic light the color of which is determined by the material chosen to form the composite layer.

Referring to FIG. 3a, there is shown an illustrative cross section view of an alternate embodiment of an outer shell of organic electroluminescent material which includes three separate and independent layers of organic electroluminescent material and voltage control layers, rather than one layer as is illustrated in FIG. 3, the materials for each of the three composite organic electroluminescent layers 25/26 are preferably chosen so that each produces a different "primary color" of light when it is luminescing. Since the voltage of control layers 23 and 24 are separately and independently controlled, a full color display can be generated by this embodiment.

Referring next to FIG. 4, there is a top view of an illustrative segment of the organic electroluminescent material 21 as shown in FIG. 3 wherein it is depicted how the etched wires comprising the ITO (or other similar material) layer 23 extend parallel to one another in one direction across the substrate while the etched wires of the Al (on other similar material) layer 24 extend parallel to one another in an orthogonal direction to the ITO wires. The point at which an ITO "wire" 23 and an Al "wire" 24 intersect one another forms a "pixel" in that when current flows through each of the two intersecting wires, an electric potential is produced between them which causes the organic electroluminescent material 25–26 located between the crosspoints and exposed to that voltage potential to produce light. The light 27 exits from the substrate through the transparent layer 22. Thus, a display device including any number of pixels located at a selectively spaced distance from one another can define a display area of desired resolution. Displays may be generated on the surface of the material 21 by selectively energizing particular pixels by pulsing current selectively through the orthogonally intersecting layers of "wires" formed on the upper and lower surfaces on each of the side of the light emitting polymer or Alq layers 25–26.

Multicolor displays may be formed by stacking a plurality of the layers of material 21 shown in FIG. 3, as shown in FIG. 3a, and choosing the particular organic electroluminescent materials 25–26 used to construct each of the stacked assemblies 21 so that each layer produces a light of a different primary color. By varying the timing of the enablement of each of the pixels and the intensity of the light produced from each of the primary color organic electroluminescent material layers in, for example a three layer assembly, a full color display made up of generally all colors can be created.

Figures 5, 6, 14:
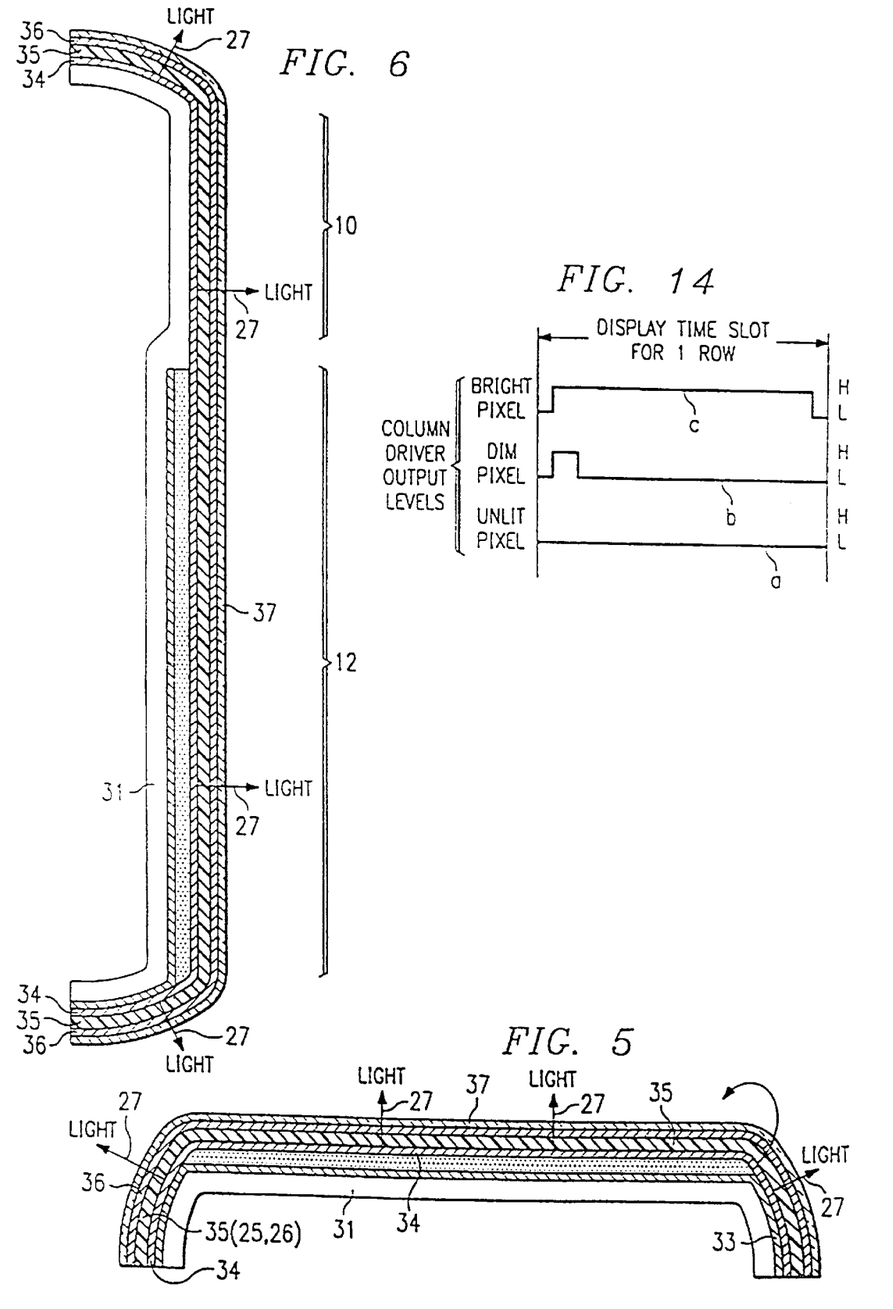
FIG. 5 is a diagrammatic cross section view, taken about the lines 5—5 of FIG. 1, showing the various layers of material comprising the organic electroluminescent outer shell of the telephone of FIG. 1.
FIG. 6 is a diagrammatic cross section view, taken about the lines 6—6 of FIG. 1, showing the various layers of material comprising the organic electroluminescent surface of the telephone of FIG. 1.
FIG. 14 is a timing diagram of the sequencing of pixel drivers in an organic electroluminescent display of the type used in the present invention.

Referring next to FIG. 5, there is shown a partial cross section view taken along lines 5—5 of FIG. 1 of the outer housing of the telephone instrument 11 construction in accordance with the present invention. It can be seen how the outer housing 9 of the telephone can be made up of two half housings which are fitted together to enclose the telephone circuitry. Each half housing comprises an inner lower shell 31 and an outer upper shell 37 which are sealed to one another. Each of the shells 31 and 37 is both moisture and oxygen impermeable. Between the sealed shells 31 and 37 there may be located a touch screen layer 33 constructed in accordance with well known techniques for providing for user input of information by touching a screen with either the user's finger or an instrument. The touch will produce a signal indicative of the specific area on the screen which was touched and thereafter interpreted by circuitry in accordance with the message on the screen overlying the touched area.

More specifically, touch screen technology is a general term for any type of touch or pressure sensitive user input device. This technology responds to either impulse or a moving touch. The devices may be constructed in clear layers and be positioned over an active display image. They can also be positioned under flexible membranes and/or resilient materials. Touch sensitive devices employ X and Y direction membranes across the face of the device and in essence also form a grid or array of"pixels." When the surface of the touch device is touched by a user, the position of that touch is determined by the voltage drop across each of the respective membranes at a particular "pixel" location. Continuous, accurate and even moving touch information can be conveyed and applications are only dependent on the sophistication of the triggering and sensing electronics and the material used in the touch sensitive screens. Electrical connections to both the touch sensitive screens as well as the light emitting organic electroluminescent material screens described above in connection with FIGS. 3 and 4 may be made by wires, ribbon cables, flex conductors and/or any other type of elastomeric connector.

Above the touch screen layer 33 there is a conductive surface 34 which is etched or otherwise partially removed to form an array of elongate parallel aluminum (Al), or other suitable material, conductive "wires" 24. Above the layer 24 comprising aluminum "wires" are a pair of layers of material 25–26 comprising electroluminescent polymer materials. Immediately above the composite layer 35 of electroluminescent polymers 25–26 is a layer of indium tin oxide (ITO), or other suitable material, conductive materials 36 which has also been etched into a series of parallel strips comprising "wires" 23. As discussed above in connection with FIGS. 3 and 4, each of the "wires" 23 and 24 is connected to a power supply to be selectively driven with electric current by a circuit not shown. Each of the "wires" 24 in the ITO layer 36 is positioned to extend in an orthogonal direction to the "wires" 23 in the aluminum layer 34 and each are connected to a separate driver circuit (not shown) which selectively connects an electric potential to selected ones of the "wires" to illuminate "pixel" areas within the layer 25–26 of organic electroluminescent material at each crosspoint of electrically energized wire in the respective layer 34 or 36 and produce light 27 which exits through transparent shell 37. The upper surface of the array comprising upper outer shell 37 is formed of transparent material which is impermeable to both moisture and oxygen. Sealing of each of the inner and outer shells to one another to form an assembly comprising a half housing is important in an organic electroluminescent device because both moisture and oxygen rapidly degrade the efficiency of the organic electroluminescing material. Such materials must be protected from these substances by being sealed within impermeable bearers. Alternatively, a transparent touch sensitive device 33 might be applied to the upper surface of the outer shell 37 rather than being located within the sealed assembly.

While FIG. 5 only depicts the upper surface and the rounded side surfaces of the telephone instrument 11 as being covered by one or more layers of an organic electroluminescent material, it should also be understood that the entire outer surface of the telephone instrument 11 might be covered with such material. While a touch sensitive surface may not be needed in areas other than areas intended to accept user input, the entire outer surface of the telephone 11 may advantageously be covered with organic electroluminescent material for reasons further described below.

It should also be understood that while a single composite layer 35 of organic electroluminescent material is indicated, (sandwiched between a layer 34 of aluminum (or other similar material) wires 24 on one side and a layer 36 of ITO (or other similar material) wires 23 on the other side), multiple composite layers of organic electroluminescent material each surrounded by control grid-like "wiring" may be provided as illustrated in FIG. 3b. Such multiple composite layer assemblies would then enable a full range of colors to be implemented in an organic electroluminescent display by selectively energizing different layers which produce light of different primary colors in varying degrees and in varying patterns.

Referring next to FIG. 6, there is shown a longitudinal cross section view taken about lines 6—6 of FIG. 1. As indicated in FIG. 1, the upper surface area 12 of the housing of the telephone 11 may be selectively configured by software, either programmed by the manufacturer or by the user, into one or more discreet areas. For example, there is shown in FIG. 1 a first area 10 which may comprise a display area of the telephone and a second area 9 which may comprise a keyboard/user input-output area for the telephone. As illustrated in more detail in FIG. 5, the entire area on the upper surface comprises an outer shell 37 and an inner shell 31 formed both being formed of an oxygen and moisture impermeable material and sealed together around their periphery. A layer of conductive aluminum (or other similar material) grid "wires" 34 and an orthogonal layer of ITO (or other similar material) grid "wires" 36 underlie and overlie, respectively, the composite layer of organic electroluminescent materials 35. The outer impermeable shell 37 is sealed against the lower impermeable shell 32 to ensure that no moisture or oxygen reach the composite layer 35 of organic electroluminescent materials.

The upper surface 12 of the telephone has been arbitrarily divided into a keypad area 9 and a display area 10. Underlying the keypad area 9 is the touch sensitive keypad device 33 adapted for responding to user input by touch against the upper surface of the keypad area 9. The organic electroluminescent upper surface 12 of telephone 11 allows the system to be selectively programmed by software to define the pixilated regions throughout the surface area 12 into various zones. One zone can be arbitrarily designated as a display area, such as 10, and the other arbitrarily defined as a user input-output area 9. Just as the face of a cathode ray tube (CRT) screen can be configured and changed by the software driving the electron guns simultaneously scanning the screen and selectively energizing pixels thereon to cause the screen to produce an image, so also the ITO (or other suitable material) and Al (or other suitable material) electric grid(s) can be driven to stimulate the pixels defined by each of the grid cross points above and below the organic electroluminescent material layers positioned between each of the cross points to produce light at selected locations and thereby, any desired image. Moreover, different areas may contain different images during different times. For example, when the telephone is turned on but not being actively used to send or receive communication, the system could be programmed to produce a selected color over the entire exterior surface of the telephone, which, as described above, can be covered by one or more of the composite organic electroluminescent layer assemblies to produce various colors. Similarly, the system can be programmed by software controlling a circuit for selectively applying electric power to the organic electroluminescent layer assemblies to generate and display a given design, such as a flower, on the front upper surface 12 of the telephone when it is in standby mode. In the event the user receives a call or desires to place a call and puts the telephone into active mode, the image of the flower can be caused by the software to disappear and the surface area immediately be visually reconfigured into the keypad and display areas 9 and 10, described above. In addition, the coloration of background and lettering of both the display and keypad area can be selectively programmed by either the manufacturer or the user. Thus, a certain background color and certain colors of letters can be selectively chosen based upon user preference.

Figure 7:
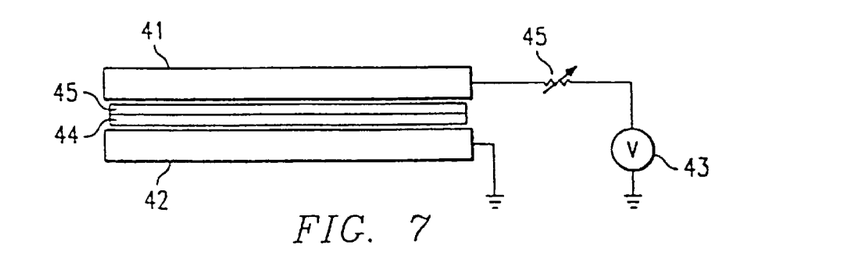
FIG. 7 is a schematic diagram of an illustrative brightness control for an organic electroluminescent layer of the type used in the present invention.

Referring next to FIG. 7, there is shown an illustrative schematic diagram of a power supply and control for an organic electroluminescent device of the type employed in the present invention. A pair of ITO (or other suitable material) and Al (or other suitable material) layers 41 and 42 are, respectively, grounded and connected to a voltage source 43 through means for varying the voltage between the organic electroluminescent layers 44 and 45. By changing the voltage drop across voltage control 46 the degree of color intensity in the light produced by the organic electroluminescent layers 44 and 45 is varied.

Figure 8:
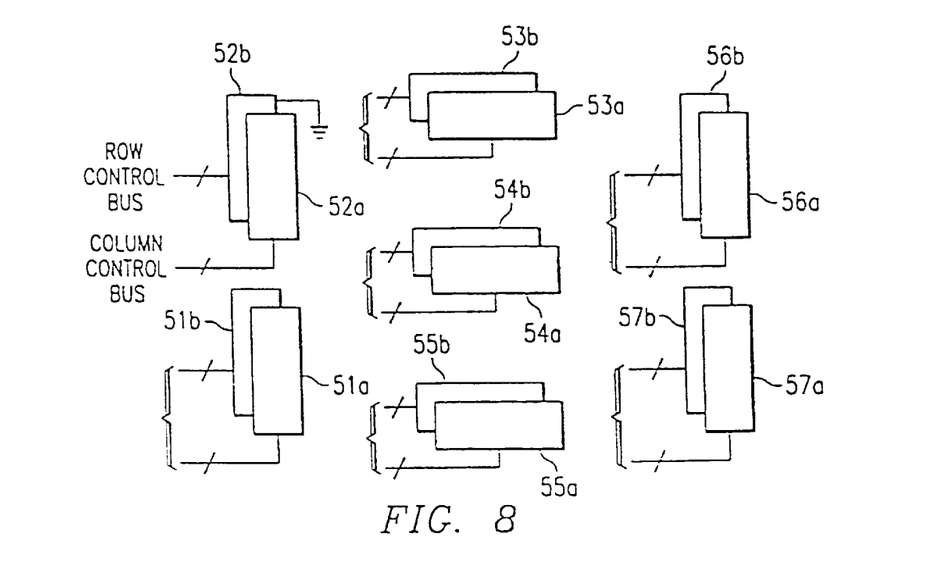
FIG. 8 is a schematic diagram illustrating the control of character segments in organic electroluminescent material layers of the type used in the present invention.

FIG. 8 illustrates an array of electrode pairs comprising elements 51a–b charging 57a–b. Each of the electrode pairs may comprise the opposed surface areas at the crosspoints of a plurality of elongate orthogonal "wires" of Al (or other suitable material) and ITO (or other suitable material). The area between the two conductive electrodes is filled with a composite layer of organic electroluminescent material so that upon selective application of a voltage between different ones of the electrode pairs by a power supply, there is created an 7 element character display, for example, to selectively display the numbers 0–9. Each of the elements 51a–57a is connected, respectively, to a row control bus driver lead from a power supply (not shown) while each of the elements 51b–57b is connected, respectively, to a column control bus driver lead. It should be noted that most conventional drive schemes and circuits used in conventional LCD type displays can be utilized on organic electroluminescent displays or backlights.

Figure 9:
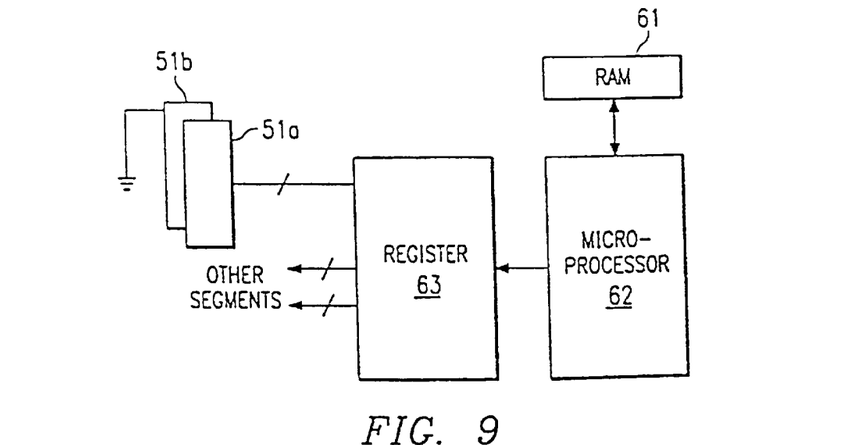
FIG. 9 is a block diagram of the control circuitry for a segmented character display.

Referring to FIG. 9, there is shown a column/row drive circuit for one of each of the pair of the elemental segments shown in FIG. 8. A random access memory 61 is connected to a microprocessor 62 which drives a register 63. The output of the register 63 is connected to a plurality of the elements, for example segment 51a, as well as additional elements. Upon selective energization of the register by the microprocessor under control of control software stored in RAM memory, a sequence of elements are energized to create a changing display in a color defined by the composition of the organic electroluminescent material between the elements.

Figure 10:
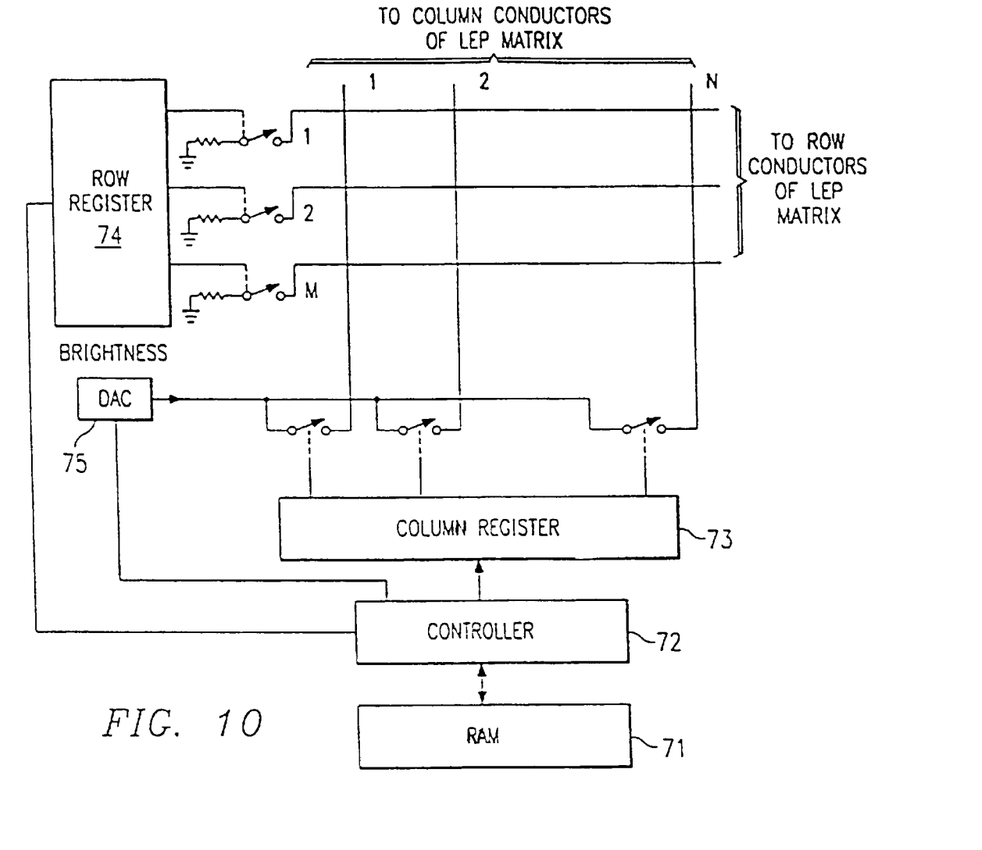
FIG. 10 is a schematic diagram of the control circuitry for a monochromatic graphics display incorporating an organic electroluminescent material display of the type used in the present invention.

Referring next to FIG. 10, there is shown a circuit for controlling a full monochrome graphic display. A random access memory 71 is connected through a controller 72 which selectively drives a column register 73 and a row register 74. A digital/analog converter 75 controls the amount of power to be delivered to the rows and columns of the orthogonal "wires" by the circuit. The row register controls, for example, the voltage on the plated "wires" in one of the orthogonal directions 76 of the organic electroluminescent display (FIG. 4) while the column register 73 controls the voltage to be applied to the plated "wire" in the other orthogonal direction 77 of the organic electroluminescent display (FIG. 4). Thus, pixels on a grid-like array such as that illustrated comprising the front surface 12 of the telephone 11 in FIG. 1, may be selectively controlled by software contained within the RAM 71 to selectively generate either a solid color or an image design or pattern as desired on that surface. The circuitry of FIG. 10 is for the control of a single color of organic electroluminescent material.

Figure 11:
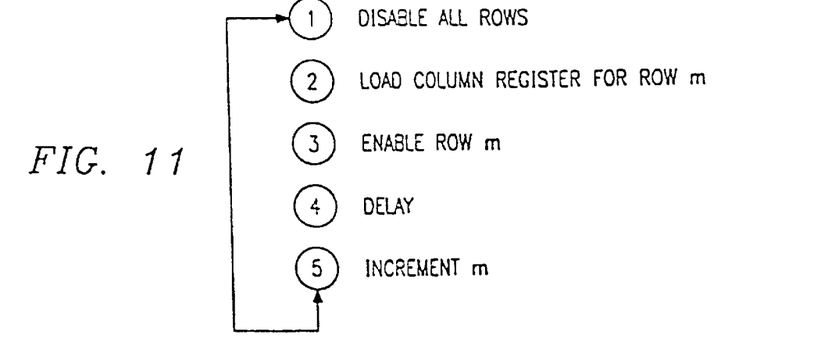
FIG. 11 is a sequence diagram illustrating the control of an organic electroluminescent display by the circuit of FIG. 10.

Referring next to FIG. 11, a sequence chart illustrating the sequence of operation of the circuit of FIG. 10 is depicted. In step 1, all rows are disabled followed by step 2 where the row register is loaded for one of the rows, e.g. row M. In step 3, the system enables row M by applying voltage to it and at step 4 a delay is implemented. Finally, at step 5 the system increments M and moves back to 1 to disable all rows and cycle through again. The column leads are controlled a similar fashion. The cyclic operation of such rows and columns are controlled by software to produce the desired display.

Figure 12:
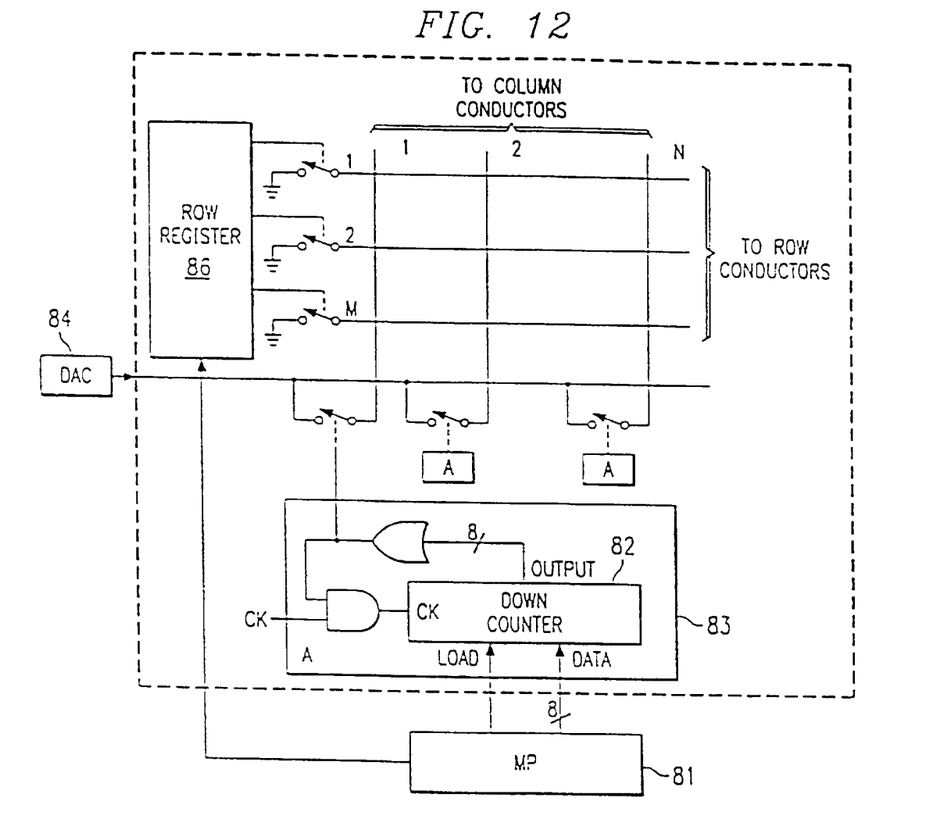
FIG. 12 is a block diagram of the circuitry for the control of a full color graphics organic electroluminescent display of the type used in the present invention.

Referring next to FIG. 12, there is shown an illustrative circuit diagram for a driving circuit for an organic electroluminescent display of the type employed in the present invention which implements a full display color. In FIG. 12, a microprocessor 81 controls the down counter 82 within a column register 83. A digital/analog converter 84 controls the intensity of each color. The column register 83 controls one direction while a row register 86 controls the other orthogonal direction. There is a duplicate circuitry of FIG. 12 for each color so that full enablement of full color graphics is possible if the colors in each layer of organic electroluminescent material are chosen, for example, to be primary colors, respectively.

Figure 13:
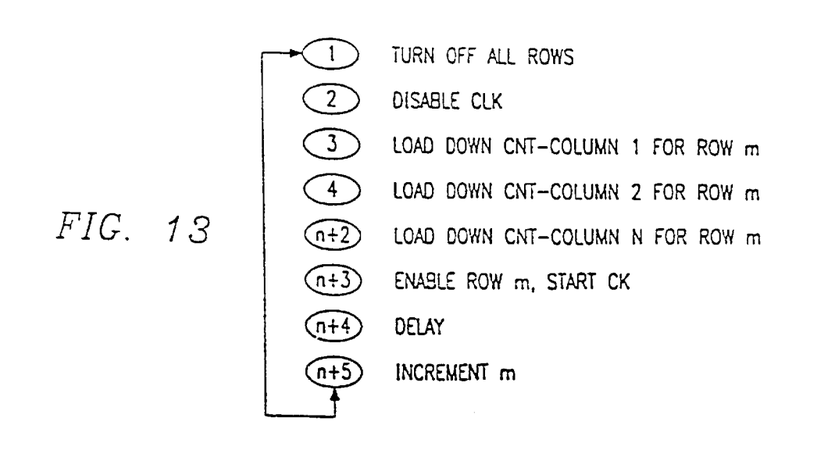
FIG. 13 is a sequence diagram illustrating the control of an organic electroluminescent display of the type used in the present invention by the circuit of FIG. 12.

Referring briefly to FIG. 13, there is shown a sequence chart depicting the operation of FIG. 12. In Step 1, all rows are turned off and the system moves to step 2 at which the circuit is disabled. At 3, the system downloads the counter column 1 for row M, at 4 downloads the counter column 2 for row M and so forth through column N for row M to sequence through the pattern.

In FIG. 14, there is depicted a timing diagram illustrating the driver output for different levels of illumination of a pixel. For example, in pattern "a" there is no voltage and therefor the pixel is unlit. In pattern "b" there is a relatively short pulse which creates a dim pixel while in pattern "c" the pixel is driven for a considerable period of time thus producing a brighter pixel. The display given is for a time slot for one row.

By way of general summary, the basic principles of operation of the organic electroluminescent display incorporated into the present invention are somewhat related to those used in liquid crystal displays (LCDs). An organic electroluminescent layer such as a light emitting polymer layer or layers (LEPs) or Alq are sandwiched between two conductive layers comprising Indium Tin Oxide (ITO) (or other suitable material) and Aluminum (Al) (or other suitable material) that are etched, usually via a laser, or stereo lithography, into conductive elongate conductive strips comprising "wires." Each of the etched "wires" on these respective areas run perpendicular to one another. At the crossing point of the "wires" between the top ITO (or other suitable material) layer and the bottom Al (or other suitable material) layer, a pixel is formed. A particular pixel is lighted by voltage when the appropriate ITO (or other suitable material) "wire" and the corresponding "Al" (or other suitable material) are combined in a circuit. The current going through the crosspoint between the two wires excites the LEP or Alq layer and light is emitted. In current technology, organic electroluminescent materials, such as LEPs and Alq have been developed that exhibit the colors green, yellow, blue and red. The color green/yellow has proven to be the most efficient color so far. The light emitting organic electroluminescent material display operates at a relatively low voltage and a reasonable current and give light levels that are comparable to both light emitting diodes (LEDs) and liquid crystal displays (LCDs).

In one aspect of the system of the present invention, a organic electroluminescent layer with conductive ITO (or other suitable material) and Al (or other suitable material) layers is attached to a touch screen type device and utilized as a user interface which can be molded or bonded to the cover of a communication device such as a cellular telephone. The addition of a touch screen to the organic electroluminescent layer eliminates the need for any type of keypad connections in the product. This greatly reduces the part count and simplifies manufacturing of the device. Moreover, as pointed out above, the cover of the telephone 12 is utilized as a display, keypad and any other user interface device desired by selective programming the control software to produce the desired display area on the front. This dramatically reduces the size of the cellular telephone over those in which the display and keypad are separate and take up considerable space each.

In one technique for constructing one embodiment of the assembly of the invention, the touch screen device 33 is laid over the upper surface of the bottom outer shell 31 and bonded into place. Next the aluminum layer (or other suitable material) 34 of the organic electroluminescent assembly is deposited and "etched" to form conductive "wires" 23 comprising elongate spaced apart areas on the surface. Next, the layers 25 and 26 of the organic electroluminescent composite layer 35 are deposited to the appropriate thickness. Finally, the ITO (or other suitable material) conductive layer 36 is deposited on the surface and "etched" into conductive "wires" 24 with the aluminum and ITO (or other suitable material) etched "wires" running perpendicular to each other in order to define the required pixels over the surface, preferably comprising a rectangular grid array. Finally, moisture and oxygen impermeable upper outer transparent shell 37 is deposited inside an outer cover and on the surface of the ITO (or other suitable material) layer to encapsulate the composite organic electroluminescent layer 35 and conductive layers 34 and 36.

In addition, the flexibility of the organic electroluminescent layer in the touch screen allow all surfaces of the outer shell of the telephone to be covered if desired. This allows the display or the keypad or the user interface and combinations thereof to take up the entire upper visible surface area of the telephone as illustrated with surface 12 of telephone 11. Connection to the ITO and Al (or other suitable materials, respectively) layers as well as the touch screen is made by conductive layers deposited on the shell of the telephone or by simply leaving through holes that allow for connection to the etched wires of the two conductive layers and for connection to the touch screen. It should also be noted that an option to the embodiment shown in FIG. 5, would be to place the touch screen device on the top of the organic electroluminescent material. This places the touch screen device on the upper surface of the telephone outer shell rather than on the bottom.

The connection methods to the display could be any of the following: ribbon cable, elastomeric connectors, flex connectors, wires, etc. However, each of the etched wires of each of the layers must have a connection in order to be driven and define pixels within the organic electroluminescent material.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. An outer housing for a modular telecommunication device comprising:
    an upper and lower shell sealed to one another and formed of a material which is impervious to moisture and oxygen with at least a portion of said upper shell being transparent to light;
    an organic electroluminescent display assembly contained within said sealed upper and lower shells which includes,
    a composite layer of organic electroluminescent material having the characteristic of producing illumination in response to voltage across the material;
    a first layer of electrically conductive material on one side of said layer of composite organic electroluminescent material, said first layer comprising a plurality of parallel elongate conductive strips separated from one another and connected to an electrical terminal on the outside of said sealed upper and lower shells;
    a second layer of electrically conductive material on the other side of said layer of composite organic electroluminescent material from said first layer, said second layer comprising a plurality of parallel elongate conductive strips separated from one another and extending in a direction at an angle to the conductive strips in said first layer to define a pixel area within the organic electroluminescent layer between each crosspoint region between an overlying and underlying conductive strip, each of said strips in said second layer also being connected to an electrical terminal on the outside of said sealed upper and lower shells; and
    a circuit for selectively applying electrical power to the electrical terminals connected to selected ones of said separate strips within said first and second conductive layers to illuminate said pixel areas at the crosspoint regions between each underlying and overlying conductive strip to which electrical power is selective applied and allow said illuminated pixels to be visible through portions of said upper and lower shell which are transparent.

2. An outer housing for a modular telecommunication device as set forth in claim 1 wherein the conductive material in one of said first and second layers of conductive material includes a material such as indium tin oxide and the conductive material in the other layer includes a material such as aluminum.

3. An outer housing for a modular telecommunication device as set forth in claim 1 wherein said plurality of strips in said first layer of conductive material extend in a direction orthogonal to said plurality of strips in said second layer of conductive material.

4. An outer housing for a modular telecommunication device as set forth in claim 1 wherein said composite layer of organic electroluminescent material having the characteristic of producing illumination in response to voltage across the material includes at . least two separate layers of a light emitting polymer material such as poly-phenylene-vinylene.

5. An outer housing for a modular telecommunication device as set forth in claim 1 wherein said composite layer of organic electroluminescent material having the characteristic of producing illumination in response to voltage across the material includes a hydrox-yquinoline-aluminum monomer material, or Alq.

6. An outer housing for a modular telecommunication device as set forth in claim 1 wherein said organic electroluminescent display assembly contained within said sealed upper and lower shells also which includes:
    a touch sensitive screen underlying at least a portion of said outer shell which is transparent to light to define a user input region, said screen having electrical connections passing through said sealed upper and lower shells for connection to external circuitry for receiving input signals from a user.

7. An outer housing for a modular telecommunication device as set forth in claim 6 wherein said circuit for selectively applying electrical power to the electrical terminals connected to selected ones of said separate strips within said first and second conductive layers is controlled in a manner that illuminates selected pixels in the organic electroluminescent layer at the crosspoints between each of the underlying and overlying conductive strips in said user input region defined by said touch sensitive screen to provide visible guidance to a user as to where to touch said screen in order to enter a desired input into the said modular telecommunications device.

8. An outer housing for a modular telecommunication device as set forth in claim 1 wherein said organic electroluminescent display assembly contained within said sealed upper and lower shells also which includes:
    an area of said display assembly underlying at least a portion of said outer shell which is transparent to light to define a user display region, and wherein
    said circuit for selectively applying electrical power to the electrical terminals connected to selected ones of said separate strips within said first and second conductive layers is controlled in a manner that illuminates selected pixels in the organic electroluminescent layer at the crosspoints between each of the underlying and overlying conductive strips in said user display region underlying said transparent portion of said upper shell to provide visible messages to a user related to operation of said modular telecommunications device.

9. An outer housing for a modular telecommunication device as set forth in claim 1 wherein said organic electroluminescent display assembly contained within said sealed upper and lower shells also which includes:

an area of said display assembly underlying at least a portion of said outer shell which is transparent to light to define a decorative display region, and wherein said circuit for selectively applying electrical power to the electrical terminals connected to selected ones of said separate strips within said first and second conductive layers is controlled in a manner that illuminates selected pixels in the organic electroluminescent layer at the crosspoints between each of the underlying and overlying conductive strips in said decorative display region underlying said transparent portion of said upper shell to provide a decorative design to at least a portion of the upper surface of said modular telecommunications device.

10. An outer housing for a modular telecommunication device as set forth in claim 6 wherein said sealed upper and lower shells also includes at least a second complete and separate organic electroluminescent display assembly and also includes:

an area of said first display assembly underlying at least a portion of said outer shell which is transparent to light to define a user display region adjacent to said user input region, an area of said second display assembly underlying at least a portion of said outer shell which is transparent to light to define a decorative display region; and wherein said circuit for selectively applying electrical power to the electrical terminals is connected to selected ones of said separate strips within both said first and second conductive layers of said first organic electroluminescent display assembly and first and second conductive layers of said second organic electroluminescent display and is selectively operative in either one of two modes, a first mode in which it is operative and controlled in a manner that illuminates selected pixels in the organic electroluminescent layer of the second display assembly at the crosspoints between each of the underlying and overlying conductive strips in said decorative display region to provide a decorative design to the upper surface of said modular telecommunications device and, alternatively, in a second mode in which it is operative and controlled in a manner that illuminates selected pixels in the organic electroluminescent layer of the first display assembly at the crosspoints between each of the underlying and overlying conductive strips in said user input and user display regions to provide visible guidance to a user as to where to touch said screen in order to enter a desired input into the said modular telecommunications device and to provide visible messages to a user related to operation of said modular telecommunications device.

11. An outer housing for a modular telecommunication device as set forth in claim 10 wherein said circuit for selectively applying electrical power to the electrical terminals is operated in said first mode when the telecommunications device is in an idle state and in said second mode when the telecommunications device is in an active state.

12. An outer housing for a modular telecommunication device as set forth in claim 1 wherein said sealed upper and lower shells also includes at least two additional complete and separate organic electroluminescent display assemblies, and wherein the composite layers of organic electroluminescent material in each of said three assemblies is chosen to produce light in each of three primary colors and said circuit for selectively applying electrical power to the electrical terminals is connected to selected ones of said separate strips within said first, second and third conductive layers of said three assemblies and controlled so that a full color display is produced and visible through the transparent portion of said outer shell.

13. An outer housing for a modular telecommunication device as set forth in claim 1 wherein said sealed upper and lower shells are substantially entirely transparent to light, said organic electroluminescent display assembly contained within said sealed upper and lower shells underlies substantially all of the transparent portions of said shells and said circuit for selectively applying electrical power to the electrical terminals is controlled to provide a substantially uniform color to the exterior of said modular telecommunication device.

14. An outer housing for a portable radio telephone comprising:

an outer shell formed of a material which is impervious to moisture and oxygen with at least a portion of said shell being transparent to light to define user input-output and user display regions;

an inner shell formed of a material which is impervious to moisture and oxygen which is sealed around periphery to said outer shell;

an organic electroluminescent display assembly contained between said inner and outer shells which includes, a composite layer of organic electroluminescent material having the characteristic of producing illumination in response to current flow through the material;

a first layer of electrically conductive material containing a material such as indium tin oxide on one side of said layer of composite organic electroluminescent material, said first layer comprising a plurality of parallel elongate conductive strips separated from one another and connected to an electrical terminal on the outside of said outer shell through a sealed connection;

a second layer of electrically conductive material containing a material such as aluminum on the other side of said layer of composite organic electroluminescent material, said second layer comprising a plurality of parallel elongate conductive strips separated from one another and extending in a direction perpendicular to the conductive strips in said first layer to define plurality of pixel areas within the organic electroluminescent layer between each crosspoint region between an overlying and underlying conductive strip, each of said strips in said second layer also being connected to an electrical terminal on the outside of said outer shell through a sealed connection;

a touch sensitive screen possibly underlying at least a portion of said outer shell which is transparent and within said user input-output region, said screen having electrical connections passing through either of said sealed shells for connection to external circuitry for receiving input signals from a user; and a circuit for selectively applying electrical power to the electrical terminals connected to selected ones of said separate strips within said first and second conductive layers to illuminate said pixel areas at the crosspoint regions between each of the conductive strips on opposite sides of the composite organic electroluminescent layer to which electrical power is selective applied and allow said illuminated pixels to be visible through all portions of said upper and lower shell which are transparent to provide visible guidance to a user within said user input-output region as to where to touch said screen in order to enter a desired input into the said radio telephone and to provide visible messages to a user within said user display region which are related to operation of said radio telephone.

15. An outer housing for a portable radio telephone as set forth in claim 14 wherein said composite layer of organic electroluminescent material having the characteristic of producing illumination in response to current flow through the material includes at least two separate layers of a light emitting polymer material such as poly-phenylene-vinylene.

16. An outer housing for a modular telecommunication device as set forth in claim 14 wherein said composite layer of organic electroluminescent material having the characteristic of producing illumination in response to current flow through the material includes a hydrox-yquinoline-aluminum monomer material (Alq).

17. An outer housing for a portable radio telephone as set forth in claim 14 wherein said sealed inner and outer shells also include at least a second complete and separate organic electroluminescent display assembly and also includes:

an area of said first display assembly underlying at least a portion of said outer shell which is transparent to light to define said user input-output and user display regions, an area of said second display assembly underlying at least a portion of said outer shell which is transparent to light to define a decorative display region; and wherein said circuit for selectively applying electrical power to the electrical terminals is connected to selected ones of said separate strips within both said first and second conductive layers of said first organic electroluminescent display assembly and first and second conductive layers of said second organic electroluminescent display and is selectively operative in either one of two modes, a first mode in which it is operative and controlled in a manner that illuminates selected pixels in the organic electroluminescent layer of the second display assembly at the crosspoints between each of the underlying and overlying conductive strips in said decorative display region to provide a decorative design to the upper surface of said portable telephone housing and, alternatively, in a second mode in which it is operative and controlled in a manner that illuminates selected pixels in the organic electroluminescent layer of the first display assembly at the crosspoints between each of the underlying and overlying conductive strips in said user input and user display regions to provide said visible guidance to a user as to where to touch said screen in order to enter a desired input into the said radio telephone and to provide said visible messages to a user related to operation of said radio telephone.

\* \* \* \* \*

UNITED STATES PATENT AND TRADEMARK OFFICE
CERTIFICATE OF CORRECTION

PATENT : 6,035,180
DATED : March 7, 2000
INVENTOR(S): Kubes et al.

It is certified that error appears in the above-identified patent and that said Letters Patent is hereby corrected as shown below:

Column 1, line 8     Replace "etitled"
                     With --entitled--

Column 1, line 21    Replace "modem"
                     With --modern--

Column 4, line 35    Replace "1"
                     With --11--

Signed and Sealed this

Fifteenth Day of May, 2001

Attest:

NICHOLAS P. GODICI

Attesting Officer    Acting Director of the United States Patent and Trademark Office